W. W. VOSPER.
PIPE CUTTING MACHINE.
APPLICATION FILED APR. 4, 1912.
1,074,334.
Patented Sept. 30, 1913.
2 SHEETS—SHEET 1.
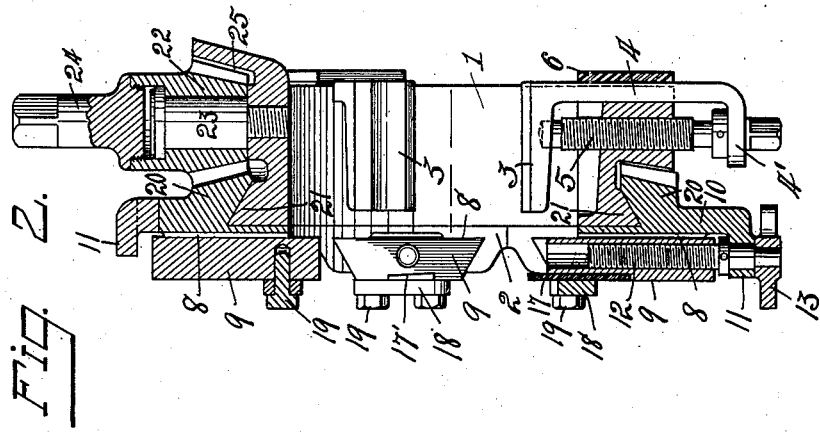
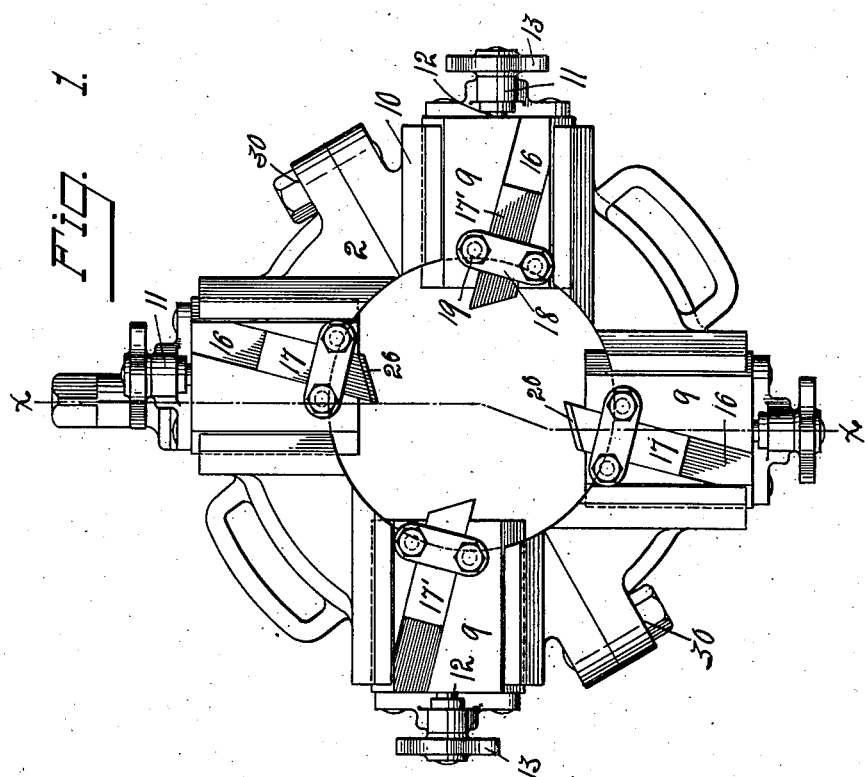
WITNESSES:
INVENTOR.
William W. Vosper,
By Owen & Owen,
His attys.

W. W. VOSPER.
PIPE CUTTING MACHINE.
APPLICATION FILED APR. 4, 1912.
1,074,334.
Patented Sept. 30, 1913.
2 SHEETS—SHEET 2.
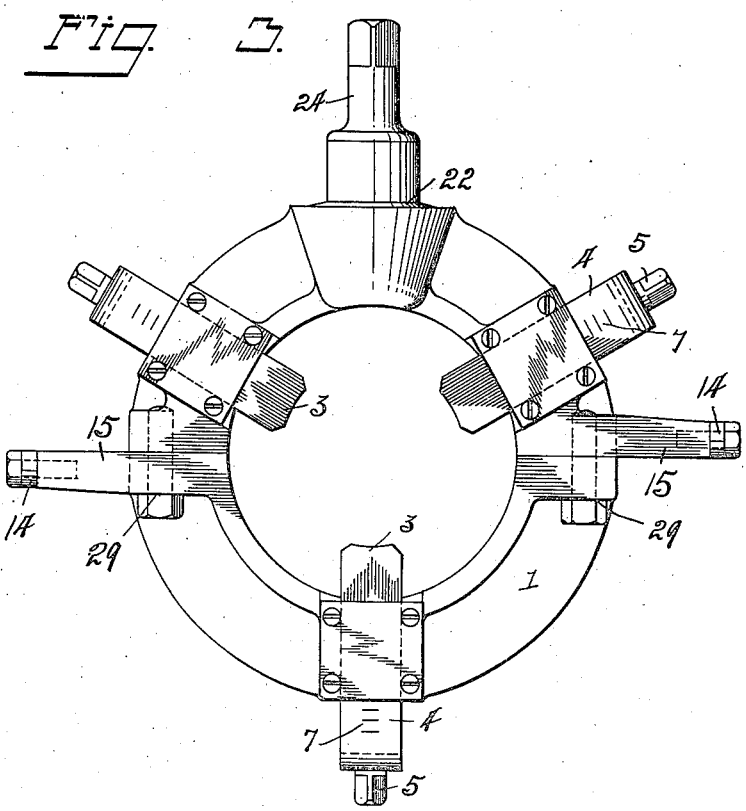
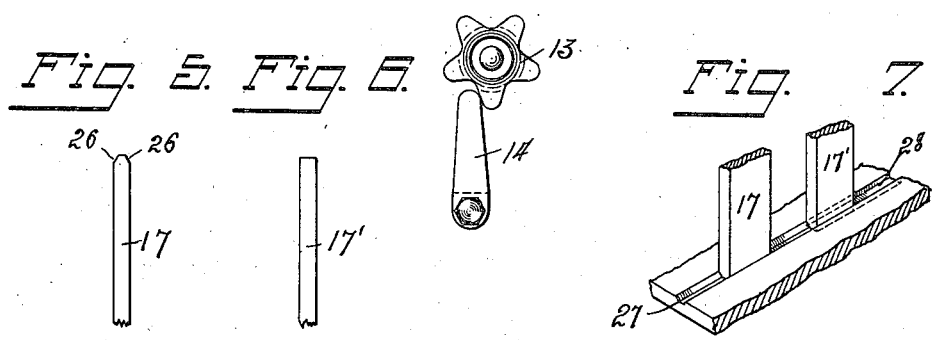
WITNESSES:
INVENTOR.
William W. Vosper,
By Owen & Owen,
His attys.

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

PIPE-CUTTING MACHINE.

1,074,334.      Specification of Letters Patent.      Patented Sept. 30, 1913.

Application filed April 4, 1912.  Serial No. 688,523.

*To all whom it may concern:*

Be it known that I, WILLIAM W. VOSPER, a citizen of the United States, and a resident of Toledo, in the county of Lucas and State of Ohio, have invented a certain new and useful Pipe-Cutting Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to machines for cutting pipes or similar articles, and particularly to hand-operated machines of this kind, but is not restricted to such use as it may be employed in any connection for which it may be adapted or appropriate.

The object of my invention is the provision of an improved apparatus of this character, which is easy and simple in its operation, strong and durable in its construction, and adapted to make a clean radial cut, which is free from the inner and outer burs left on pipes by the cutting machines commonly employed.

A further object of my invention is to arrange and construct the cutting edges of the cutting dies so that, in a set of four, for instance, the dies will alternately act to commence and complete a full width cut of a furrow, whereby to make a smooth, clean cut and to obviate the objections and difficulties incident to each die taking a full width cut of the furrow bottom.

Further objects and advantages of the invention will be apparent from the following detailed description.

The invention is fully described in the following specification, and while, in its broader aspect, it is capable of embodiment in numerous forms, a preferred embodiment thereof is illustrated in the accompanying drawings, in which,—

Figure 1 is a plan view of the die carrying side of an apparatus comprising my invention. Fig. 2 is a cross-section thereof on the line *x*, *x* in Fig. 1. Fig. 3 is an outer face view of the work holder with the die carrying head removed. Fig. 4 is an outer end view of two of the automatically operating die adjusting parts. Figs. 5 and 6 are details of the two forms of cutting dies employed, and Fig. 7 is a diagrammatical view in perspective of a piece of work with two dies having differently formed cutting edges successively acting thereon.

Referring to the drawings, 1 designates the work-holder, having a central opening of suitable size and shape to receive work to be acted on, and 2 the die-carrying head, which is suitably mounted for relative rotary movements upon an end of the work holder, and driven by any suitable means carried by the holder.

The work-holder carries a plurality of radially-movable work clamping parts 3 within its opening, such parts being shown, in the present instance, as three in number, and each of these parts has a shank 4 projecting outward therefrom through a registering radial guide-opening or recess in the outer end of the holder and is bent laterally at its outer end, as at 4'. An adjusting screw 5 threads radially through the holder for each clamping part, with its inner end bearing against the associated part 3 and its outer end projected through and anchored against longitudinal movements in the bent end 4' of the shank of such part. The shanks 4 are retained in the holder recess by plates 6, and have their outer surfaces preferably graduated, as at 7, to facilitate an adjustment thereof to accurately center a piece of work within the holder, as is apparent.

The die-carrying head 2 is substantially of circular form, with a central work-receiving opening conforming to that of the holder 1, and has, in the present instance, a set of four radial recesses 8 in its outer face in which die-carrying blocks 9 are dove-tailed or otherwise suitably retained for radial movements. The recesses 8 are shown as being provided in enlargements 10 of the head, which have ears 11 projecting laterally therefrom across the outer ends of the recesses 8. Adjusting-screws 12 thread longitudinally into the outer ends of the blocks 9 and have their outer ends working through openings in the ears 11 and anchored in any suitable manner against axial movements relative thereto. A star-wheel 13 is carried by each screw 12 without its carrying-ear 11, and upon a relative rotation of the head and holder this wheel is intended to have intermittent rotary movements imparted thereto by contact with one or more fingers 14, which project laterally from arms 15 extending radially from the holder, thus effecting a uniform automatic inward adjustment of the die-carrying blocks upon a turning of the head in one direction relative to the holder. The wheels 13 may also serve as hand-wheels for use in effecting a hand adjustment of the blocks 9.

The blocks 9 are provided in their outer faces with recesses 16 in which cutting dies 17 and 17' are secured in properly adjusted positions by clamping-plates 18 and screws 19. The recesses 16 are preferably so disposed as to incline the forward edge of a die-bar rearwardly from the point of cut, as shown in Fig. 1.

The head 2 has an annular flange 20 projecting from its inner side for engaging under an annular shoulder 21 around the inner end of the work-holder to coöperate therewith in retaining the two parts in relative rotary engagement. The flange 20 also has its outer end formed with teeth to provide a gear on the head for the drive-gear 22 to mesh with, as shown in Fig. 2. The gear 22 is mounted on a stud 23 projecting radially from one side of the holder 1, and has a shaft portion 24 fixedly projecting from its outer end for receiving a crank or ratchet handle. The flange 20 preferably rests within an annularly reduced portion of the holder to render the construction compact and to provide a guard for the flange teeth, while the gear 22 rests within a recess 25 in the holder for the same purposes.

In order to make a clean cut, the edges of which are not gouged out, and to also prevent the formation of inner and outer burs on the section ends of a pipe or similar article when severed, I change the shapes of the cutting edges of alternate ones of the dies 17 and 17' so that the dies will at least operate in pairs in the making of a complete cross-sectional cut of the furrow made thereby. To accomplish this I reduce the width of the cutting edges of opposite or alternate ones of the dies 17 substantially one-half relative to the width of the cutting edges of the other dies, as by chamfering the side edges thereof, as shown at 26 in Figs. 1 and 5; the other alternately arranged dies of the set having their cutting edges preferably the full width of the furrow intended to be made by the dies. With this arrangement the dies having the narrow cutting edges, first act on the work to produce a narrow complemental groove 27 therein, and the broad cutting edges of the dies 17', then act to cut off the tapered side edges of the furrows made by the die 17 to produce the flat-bottomed parallel-sided furrow 28, as diagrammatically indicated in Fig. 7. It is thus apparent that each die strips a portion of metal which is of less width than the full width of the furrow being cut, thus enabling the metal chips to work inwardly relatively to the furrow sides instead of tending to gouge out the sides of the furrow as is found to be the case where the cutting edge of each die is equal in width to the furrow being cut.

It sometimes happens that it is desirous to cut a pipe over which the cutter cannot be slipped endwise thereof as in the case of a pipe in a building. To adapt my present cutter for easy engagement with a pipe of this character I make the work-holder 1 and die-carrying head 2 each of two sectional form and bolt or screw such sections together, as indicated at 29 in Fig. 3 and 30 in Fig. 1. With this arrangement the sections can be easily and quickly assembled around a pipe to be cut, as is apparent.

In the use of my apparatus, it is mounted upon a pipe or other article to be cut and the holder centrally clamped thereto by an adjusting of the clamping parts 3 for such purpose. The cutting dies are then moved into contact with the work by a manual adjustment of the screws 12. Upon a rotation of the die-carrying head, which is accomplished by a turning of the drive pinion 22, the star-wheels 13, on the adjusting-screws 12, successively move into contact with and have partial turning movements imparted thereto by the fingers 14 projecting from the work holder. These fingers are shown in the present instance as being two in number so that the star wheels receive two adjusting impulses at each revolution of the die-carrying head, thus effecting a slow intermittent inward feeding of the dies as the cutting of the work progresses.

I wish it understood that my invention is not limited to any specific construction or arrangement of the parts except in so far as such limitations are specified in the claims.

Having thus described my invention, what I claim as new, and desire to secure by Letters Patent, is,—

1. In a machine of the class described, a work-holding collar having the inner end portion thereof annularly reduced to form a circumferential recess, a die-carrying head fitting against the inner end of said collar and having an annular portion working in said groove and coöperating with the adjacent end edge of the collar to hold the collar and head in assembled relation for relative rotary movements, said annular portion having its outer edge toothed to form a crown gear on the head, which gear has its teeth covered by the side wall of the collar groove, and a drive pinion mounted in a part of said collar whereby its teeth are inclosed and meshing with the teeth on the annular portion of said head.

2. In a machine of the class described, the combination of a work-holding collar having its inner end recessed to form an annular circumferential groove having an outwardly tapered base portion, said collar also having a pinion-receiving socket in one side thereof, said socket being substantially the depth of said recess and open at one side to the recess, a die-carrying head having an opening therein in register with the annular opening and seating at its inner edge against the inner end of the collar and having a concentric annular flange on its inner side with its inner edge complemental to the tapered base of the collar recess to have rotary dove-tailed engagement therewith to retain the collar and head in assembled relation, the outer end of said flange being toothed with the teeth thereof protected by the inner wall of the collar recess, a stub-shaft projecting from the collar centrally within the socket thereof, and a drive pinion mounted on said shaft in mesh with the teeth on the head flange with its teeth protected by the wall of said socket except at the point of meshing thereof with the flange teeth.

3. In a machine of the class described, a work-holding collar having a radial opening therein, a U-shaped work clamping member having its looped portion mounted for radial movements in said opening and having one leg projecting into the central collar opening for clamping engagement with work disposed therein, and an adjusting screw threaded radially through said collar and having its inner end bearing against the inner clamping leg of said member and its outer end journaled in the outer leg of said member and anchored against longitudinal movements relative to said member.

In testimony whereof, I have hereunto signed my name to this specification in the presence of two subscribing witnesses.

WILLIAM W. VOSPER.

Witnesses:
S. T. KLOTZ,
C. W. OWEN.